United States Patent
Nachenberg et al.

(10) Patent No.: US 7,721,330 B1
(45) Date of Patent: May 18, 2010

(54) UTILITY COMPUTING FIREWALL

(75) Inventors: Carey S. Nachenberg, Northridge, CA (US); Alfred C. Hartmann, Round Rock, TX (US); Jeffrey Wilhelm, Los Angeles, CA (US); Frank Barajas, Redondo Beach, CA (US)

(73) Assignee: Symantec Corporation, Cupertino, CA (US)

( * ) Notice: Subject to any disclaimer, the term of this patent is extended or adjusted under 35 U.S.C. 154(b) by 1184 days.

(21) Appl. No.: 11/199,759

(22) Filed: Aug. 8, 2005

(51) Int. Cl.
*H04L 9/32* (2006.01)
*H04L 9/00* (2006.01)
*G06F 7/04* (2006.01)

(52) U.S. Cl. .............. 726/11; 726/12; 726/13; 726/14; 726/15; 713/151; 713/152; 713/153

(58) Field of Classification Search ............ 726/11
See application file for complete search history.

(56) References Cited

U.S. PATENT DOCUMENTS

| | | | |
|---|---|---|---|
| 6,167,445 A * | 12/2000 | Gai et al. ............ | 709/223 |
| 6,950,825 B2 * | 9/2005 | Chang et al. ......... | 707/100 |
| 7,203,687 B2 * | 4/2007 | Adiba et al. ......... | 707/100 |
| 7,333,432 B1 * | 2/2008 | Mor et al. ........... | 370/230.1 |

2005/0268325 A1* 12/2005 Kuno et al. ............ 726/1

OTHER PUBLICATIONS

Eilam, T. et al., "Using a Utility Computing Framework to Develop Utility Systems," IBM Systems Journal, 2004, pp. 97-120, vol. 43, No. 1.
Monahan, B., "Infrastructure Security Modelling for Utility Computing," Hewlett-Packard Company, Jan. 17, 2005, 19 pages.
Sahai, A. et al., "Automated Policy-Based Resource Construction in Utility. Computing Environments," Hewlett-Packard Company, Aug. 21, 2003, 20 pages.
"Utility Computing—The Future State of the High-Performance IT Infrastructure," .Accenture, 2004, 12 pages.

* cited by examiner

*Primary Examiner*—Longbit Chai
(74) *Attorney, Agent, or Firm*—Fenwick & West LLP

(57) ABSTRACT

A firewall dynamically adapts to changes in a utility computing system. The utility computing system has multiple nodes that are dynamically provisioned in different roles. The different roles are best served by different security and/or Quality-of-Service (QoS) policies. The firewall selects and applies security and/or QoS policies to a node or group of nodes based on the roles provisioned to the node or group. The firewall detects when the provisioning of a node changes, and dynamically applies a new security and/or QoS policy to the node based on the new provisioning. The firewall thus provides adaptive network-level security and QoS functionality to a utility computing system.

17 Claims, 3 Drawing Sheets

UTILITY COMPUTING FIREWALL

BACKGROUND OF THE INVENTION

1. Field of the Invention

This invention pertains in general to utility computing and network security and in particular to a firewall for protecting a utility computing system environment.

2. Description of the Related Art

Utility computing is a paradigm that provides scalable access to computing resources much like electrical utilities provide access to electricity. A utility computing system has a pool of computing resources that can be dynamically provisioned to meet the changing demands of an enterprise. For example, during a typical day, 30% of the resources can be provisioned as web servers to serve HTTP requests, 40% of the resources can be provisioned to provide back-end database support, 20% of the resources can be provisioned to run JAVA middleware software, and 10% of the resources can be left idle in order to provide extra computing power during peak periods. Should demand for one of the resources increase, the utility computing system can dynamically provision some of the idle resources and/or re-provision some of the other resources to meet the demand.

At its core, the utility computing system contains a set of computers acting in the provisioned roles. The computers can be real or virtual, and can be provisioned in multiple roles. For example, the utility computing system can contain a computer that is provisioned to act as both a web server and a database server.

Computers within a utility computing system that are provisioned as web servers, database servers, or in other roles that require interaction with clients have interfaces that are exposed to the Internet and/or other networks. Due to these interfaces, the computers are susceptible to malicious behavior on the network. Thus, a computer acting as a web server and executing particular web server software is susceptible to any vulnerabilities in that software. Such vulnerabilities present a security risk and the risk is further magnified because of the large numbers of computers that are often present in a utility computing system.

A firewall is a common way to protect computers from network-based attacks. However, a firewall is not well-suited to utility computing systems where there are multiple computers in dynamically-changing roles. An administrator setting the firewall's policy might allow communications to all ports that are used in all of the potential roles, thereby creating a security risk by providing greater than the minimum set of access rights. Alternatively, the administrator can configure the firewall to provide the minimum set of access rights for a specified role, thereby running the risk that the computer will not function if it is dynamically provisioned into another role. Neither of these options is desirable.

Therefore, there is a need in the art for a firewall that is suited to protecting a utility computing system.

BRIEF SUMMARY OF THE INVENTION

The above need is met by a firewall that dynamically adapts to changes in a utility computing system. The utility computing system has multiple nodes that are dynamically provisioned in different roles. The different roles are best served by different security and/or Quality-of-Service (QoS) policies. The firewall selects and applies security and/or QoS policies to a node or group of nodes based on the roles provisioned to the node or group. The firewall detects when the provisioning of a node changes, and dynamically applies a new security and/or QoS policy to the node based on the new provisioning. The firewall thus provides network-level security and QoS functionality to a utility computing system.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
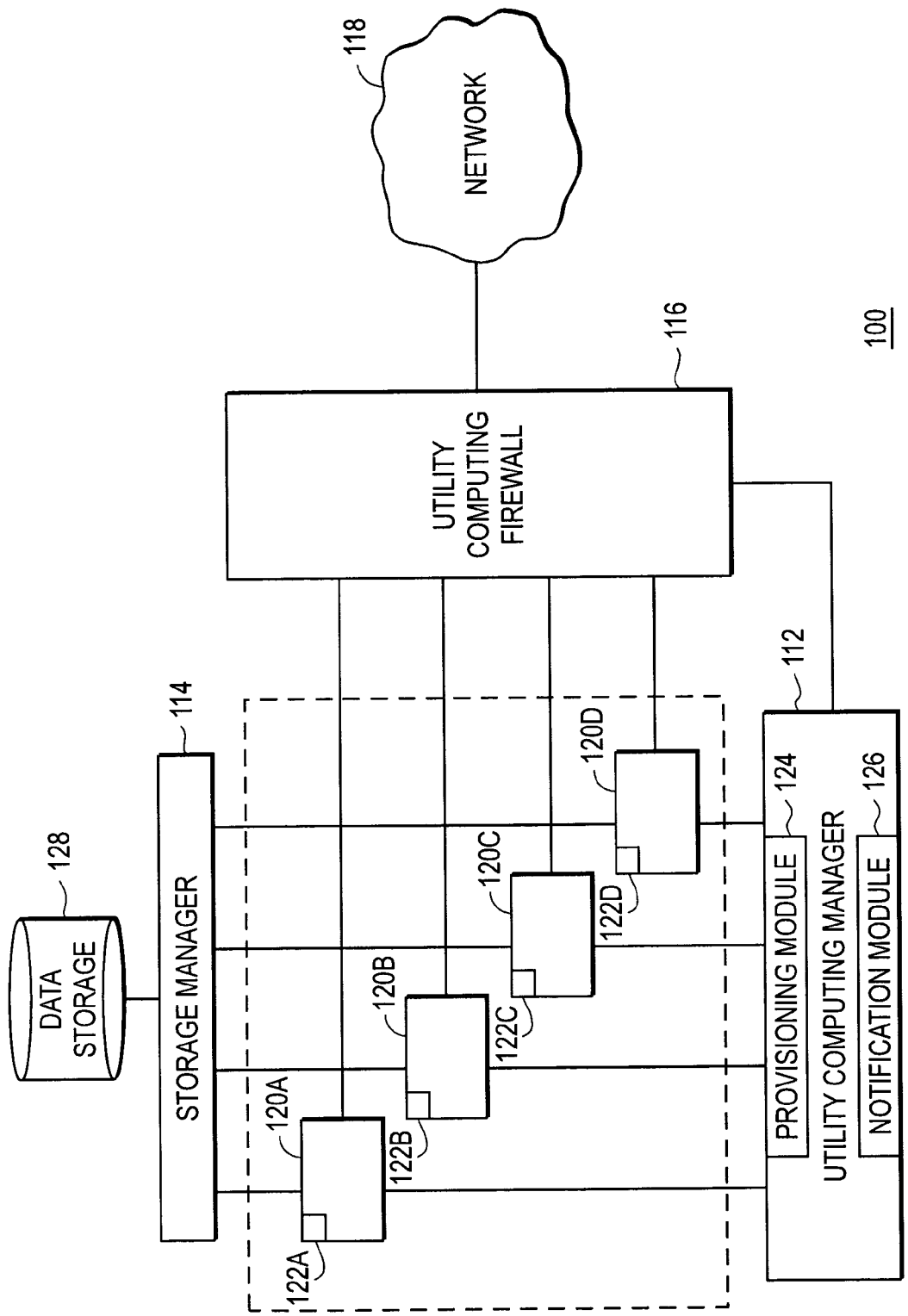
FIG. 1 is a high-level block diagram illustrating an embodiment of a utility computing system.

FIG. 1 is a high-level block diagram illustrating an embodiment of a utility computing system 100. FIG. 1 and the other figures use like reference numerals to identify like elements. A letter after a reference numeral, such as "120A," indicates that the text refers specifically to the element having that particular reference numeral. A reference numeral in the text without a following letter, such as "120," refers to any or all of the elements in the figures bearing that reference numeral (e.g. "120" in the text refers to reference numerals "120A," "120B," and/or "120C" in the figures).

The system 100 includes a pool of computing resources 110 operating under the control of a utility computing manager 112. A storage manager 114 provides storage resources for the utility computing system 100. A utility computing firewall 116 couples the computing system 110 to a network 118 and also enforces security and/or quality-of-service (QoS) policies. In one embodiment, the utility computing system 100 is controlled by an enterprise such as a company or university. The enterprise uses the pool of resources 110 itself and/or makes the pool available to interested parties, such as other enterprises and/or researchers.

The pool of computing resources 110 includes a set of computing nodes 120. Each node, represents a discrete unit of processing power. For example, a computing node 120 can be a physical machine such as a mainframe computer, a blade server, or a personal computer. In addition, a computing node 120 can be a virtual machine, such as a virtualized server executing on another computer system. A computing node 120 can include a collection of other nodes such as a set of servers and a load balancer that distributes tasks among the servers.

In one embodiment, each node 120 in the pool of computing resources 110 includes an agent module 122. As used herein, the term "module" refers to computer program logic for providing the specified functionality. A module can be implemented in hardware, firmware, and/or software. Those of skill in the art will recognize that other embodiments can have different and/or additional modules than the ones described herein. Likewise, the functionalities can be distributed among the modules in different manners.

The agent module 122 controls the operation of the node 120 in response to instructions from the utility computing manager 112. This control includes provisioning and re-provisioning the node 120 in different roles. In addition, the agent module 122 facilitates interactions between the node 120 and the storage manager 114. In one embodiment, the agent module 122 also communicates with the utility computing firewall 116.

The utility computing manager 112 controls the pool of computing resources 110. Although FIG. 1 shows the manager 112 as an entity external to the pool 110, in some embodiments the manager 112 is a module executing on one or more of the nodes 120 within the pool 110. For example, the manager 112 can be a centralized application that executes on a particular node 120 or a distributed application, such as a peer-to-peer application, that executes across multiple nodes 120 in the pool 110.

The manager 112 communicates with the agents 122 in the nodes 120 to ascertain the state of the pool 110 and provision/de-provision nodes as the needs of the enterprise change. Through agent 122 interactions, the manager 112 can determine how a node 120 is provisioned, whether a node is active or inactive, the node's rate of utilization, the processes being executed on the node, and other information describing the state of a node. The roles the manager 112 provisions are selected based on the needs of the enterprise at a given time.

In one embodiment, the manager 112 includes a provisioning module 124 for provisioning the nodes 120 into the roles. The provisioning module 124 can dynamically provision each node into one or more roles. The roles to which the nodes 120 can be assigned include a web server, a database server, an application server utilizing server software such as JAVA 2 Platform Enterprise Edition (J2EE), WebLogic, and/or WebSphere, a node in a Storage Area Network (SAN), a Lightweight Directory Access Protocol (LDAP) server, an email server, etc. In addition, the nodes can be provisioned to perform custom processing, such as video and audio processing, data analysis, and the like.

In one embodiment, the manager 112 includes a notification module 126 for notifying the firewall 116 of the roles to which the nodes 120 are provisioned. In one embodiment, the notification module 126 sends a change notification message to the firewall 116 each time the provisioning of a node changes. The message identifies a node 120 and describes the roles provisioned to the node 120. In addition, the notification module 126 can provide notifications to the firewall 116 at other times, such as when requested by the firewall 116 or another entity, or when the utility is initially brought online. In another embodiment, the agents 122 in the nodes 120 provide the notification messages to the firewall 116 instead of, or in addition to, the notification module 112. In one embodiment, change notifications and other communications between the notification module 112 and the firewall 116 are authenticated in order to prevent malicious entities from sending false notifications.

The storage manager 114 manages and provides access to a data store 128. The storage manager 114 allows the nodes and/or other entities in the utility computing system 100 to store and access data in the data store. To this end, the storage manager 114 provides functionality including data virtualization, resource contention management, and fault tolerance.

The data store 128 stores data utilized by the pool of computing resources 110 and/or other entities in the utility computing system 100. These data include executable programs utilized by the nodes 122, data utilized by the nodes while performing in the roles, and executable programs and/or data utilized by the manager 112 and firewall 116 to perform their functions. The data store 128 can be centralized or distributed. In one embodiment, the data store 128 includes local storage on some or all of the nodes 120 or other entities in the utility computing system 100.

The firewall 116 intercepts data traffic exchanged between the nodes 120 and the network 118 and enforces security and/or QoS policies, collectively referred to as "network traffic policies." In general, a security policy describes whether a node 120 is allowed to exchange certain types of data traffic with the network 118. A QoS policy, in contrast, describes the minimum acceptable performance level for the data traffic. In one embodiment, the firewall 116 operates on a per-node basis, meaning that it can apply a different security and/or QoS policy to each node. Nodes 120 provisioned in different roles may have different security and/or QoS policies. The firewall 116 receives a notification from the manager 112 and/or from the node 120 when the role of node changes, and dynamically adapts the network traffic policies for that node to the policies that are best suited to the new role. In other embodiments, the firewall 116 operates on multiple node or per-pool bases, meaning that the firewall applies the same policies to multiple nodes and/or to the entire pool 110.

In one embodiment, the firewall 116 is centralized. For example, the firewall 116 can be located in a combination firewall/router that routes traffic between the network 118 and the utility computing system 100. In another embodiment, the firewall 116 is distributed. In an example of this latter embodiment, the firewall can be implemented as a module executing on some or all of the nodes 120 in the pool of computing resources 110. In some embodiments, the functionality of the firewall 116 is distributed across multiple entities. For example, the security policies can be enforced by a module executing on a node 120 while the QoS policies are enforced by a module in a router.

The network 118 enables data communication between the utility computing system 100 and other entities coupled to the network. These other entities can include, for example, client computers utilized by end-users to browse web sites instantiated by nodes 120 or execute applications served by the nodes. Likewise, the other entities on the network 118 can include server computers that access data processed by the nodes 120 of the utility 100.

In one embodiment the network 118 is the Internet. In another embodiment, the network 114 is a local area network (LAN) or wide area network (WAN) operated by an enterprise and is not necessarily coupled to the Internet. In one embodiment, the network 114 uses standard communications technologies and/or protocols. Thus, the network 114 can include links using technologies such as Ethernet, 802.11, integrated services digital network (ISDN), digital subscriber line (DSL), asynchronous transfer mode (ATM), etc. Similarly, the networking protocols used on the network 114 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 114 can be represented using technologies and/or formats including the hypertext markup language (HTML), the extensible markup language (XML), the simple object access protocol (SOAP) etc. In addition, all or some of links can be encrypted using conventional encryption technologies such as the secure sockets layer (SSL), Internet Protocol security (IPsec), Secure HTTP and/or virtual private networks (VPNs).

Figure 2:
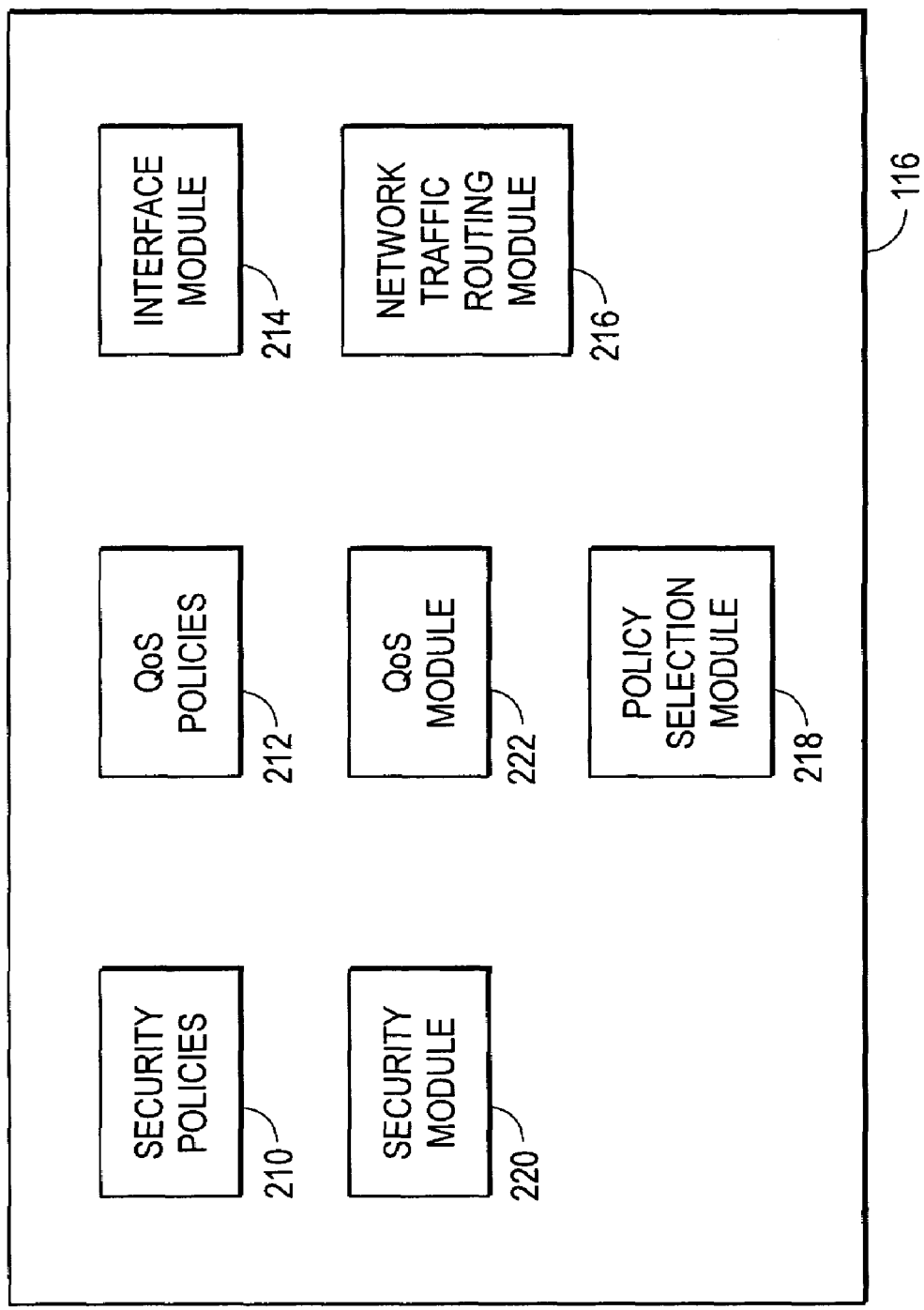
FIG. 2 is a high-level block diagram illustrating a more detailed view of the utility computing firewall of FIG. 1 according to one embodiment.

FIG. 2 is a high-level block diagram illustrating a more detailed view of the utility computing firewall 116 of FIG. 1 according to one embodiment. The firewall 116 includes a security policies module 210 storing security policies that can be applied to the nodes 120 of the utility 100. In one embodiment, the module 210 stores multiple security policies, and each policy is adapted to a particular role to which a node can be provisioned. Typically, each security policy allows only the minimum set of network resources for its corresponding role. For example, a security policy for a web server role allows communications on ports 80 and 443 because these ports are used by HTTP, but blocks communications on other ports unrelated to web serving. Security policies for other roles will allow and/or block other ports.

In one embodiment, the firewall 116 includes a QoS policies module 212 storing QoS policies that can be applied to the utility 100 and/or the individual nodes 120. In some embodiments, the QoS policies describe a QoS for the overall data traffic exchanged between the utility 100 and the network 118. For example, a QoS policy can state that web server traffic gets at least 50% of the total bandwidth available between the utility 100 and the network 118, and that all traffic has no more than a specified amount of jitter, latency, and packet loss. In other embodiments, the QoS polices describe a QoS for one or more nodes, or for nodes provisioned in particular roles. For example, a QoS policy can specify that a particular node has a greater minimum bandwidth than other nodes, that a node provisioned to provide voice over IP (VoIP) services has a lower minimum jitter than nodes provisioned in other roles, etc.

In one embodiment, the QoS policies module 212 contains rules, parameters, and/or other data that are utilized to generate a QoS policy instead of, or in addition to, the actual policies. The data describe a desired QoS in view of the overall usage of the utility computing system 100. For example, rules can describe how much bandwidth to devote to a node based on how the node is provisioned. Similarly, the rules can describe a formula for calculating the amount of the utility's total bandwidth to devote to HTTP traffic based on the number of nodes that are provisioned as web servers.

An interface module 214 receives change notification and other messages from the provisioning module 124, node agents 122, and/or other entities in the utility computing system 100. The interface module 214 authenticates the messages and/or the entities that send the messages. The authentication provides security and, for example, prevents a malicious entity from sending a bogus provisioning notification that causes the firewall 116 to apply a less restrictive security policy to a node and thereby make it susceptible to attack. Messages that fail authentication are ignored. In one embodiment, the interface module 214 reports authentication failures to an administrator because such messages might indicate that the firewall 116 is under attack.

The specific authentication technique utilized by the interface module 214 depends upon the embodiment. One embodiment of the interface module 214 uses public key cryptography techniques to encrypt the messages and/or authenticate the senders of the messages. Another embodiment requires an entity to login by providing an identification/password pair before the entity can send messages. Other embodiments use other authentication techniques.

A network traffic routing module 216 routes network traffic between the utility 100 and entities on the network 118. In some embodiments the routing module routes all traffic between the utility 100 and entities on the network 118 while in other embodiments the routing module 216 routes traffic between specific nodes 120 in the pool 110 and entities on the network 118. In one embodiment, the functionality of the routing module 216 is provided by a discrete network router.

A policy selection module 218 receives the notification messages from the interface module 214 and selects security and/or QoS polices in response to the notifications. In one embodiment, the policy selection module 218 maintains a state map that describes the state of the utility 100. The state map describes which nodes 120 in the pool 110 are active and how the nodes are provisioned. In some embodiments, the state map includes additional information, such as the levels of utilization of the nodes, the bandwidth being consumed by the nodes, and the types of traffic that constitute the usage. The policy selection module 218 updates the state map in response to messages received by the interface module 214. Thus, the state map is dynamically updated as the provisioning of the nodes changes.

The policy selection module 218 analyzes the state map and selects security policies from the security policies module 210 to apply to traffic between the utility 100 and the network 118. In one embodiment, the policy selection module 218 determines the role or roles provisioned to a particular node 120 in the utility 100 and selects the security policy 210 that provides the best protection to that node while allowing the node to perform in its provisioned role. This selection process is performed for each node in the utility 100. If a node's provisioning changes, the policy selection module 218 selects the security policy that best protects the node given its new role. In another embodiment where the security policy is applied to a group of nodes (or the entire pool 110), the policy selection module 218 analyzes the state map to determine the provisioned roles for the nodes in the group, and selects the security policy that provides the best overall protection given the roles in the group. Similarly, in an embodiment where multiple roles are assigned to a node 120, the policy selection module 218 selects multiple security policies for the node and/or select a single policy that is tailored to provide the best protection for the node given its multiple roles.

In a similar fashion, one embodiment of the policy selection module 218 analyzes the state map and uses the data in the QoS policies module 212 to select and/or generate the QoS policies for traffic between the utility 100 and the network 118. In one embodiment where the policy selection module 218 stores policies corresponding to specific roles, the policy selection module 218 selects the appropriate QoS policy or policies based on the roles provisioned to the nodes 220. In another embodiment where the QoS policy module 212 stores parameters, rules, or other data describing QoS policies, the policy selection module 218 generates a QoS policy or policies for the nodes 120 from the data.

In a per-node embodiment, the policy selection module 218 analyzes the state map to determine the one or more roles provisioned to a specific node and selects and/or generates the QoS policy for the node. For example, the policy selection module 218 can determine that a node 120 is provisioned as a VoIP server and select a QoS policy in the QoS policies module 212 that is optimized to support VoIP services. In a per utility embodiment, the policy selection module 218 analyzes the state map to determine the overall provisioning of the utility and selects and/or generates the QoS policy that best meets the requirements of the utility 100. For example, the policy selection module 218 can determine that 50% of the nodes in the utility are provisioned as web servers, 30% of the nodes are provisioned as VoIP servers, and 20% are idle and select or generate a QoS policy that best satisfies the requirements of the web and VoIP servers.

A security module 220 applies the one or more security policies selected by the policy selection module 218 to network traffic passing through the utility computing firewall 116. The security module 220 thus blocks network traffic on ports closed by the security policy and allows traffic on ports opened by the security policy. Depending upon the embodiment, the security module 220 can apply a security policy to a particular node or nodes 120 in the pool 110, and/or to the entire pool. Likewise, the security module 220 can concurrently apply different security policies to different nodes 120. In one embodiment, the security module 220 can concurrently apply different security policies to the same node 120 by merging the policies to produce a single policy that provides the minimum set of access rights necessary for the node to function in its roles.

In a similar fashion, a QoS module 222 applies the one or more QoS policies selected and/or generated by the policy selection module 218 to network traffic passing through the firewall 116. The QoS module 222 ensures that the network traffic complies with the minimum acceptable performance levels specified by the applicable policies. Depending upon the embodiment, the QoS module 222 can apply a QoS policy to a particular node or nodes 120 in the pool 110, and/or to the entire pool. The QoS module 222 can concurrently apply different QoS policies to different nodes 120.

Figure 3:
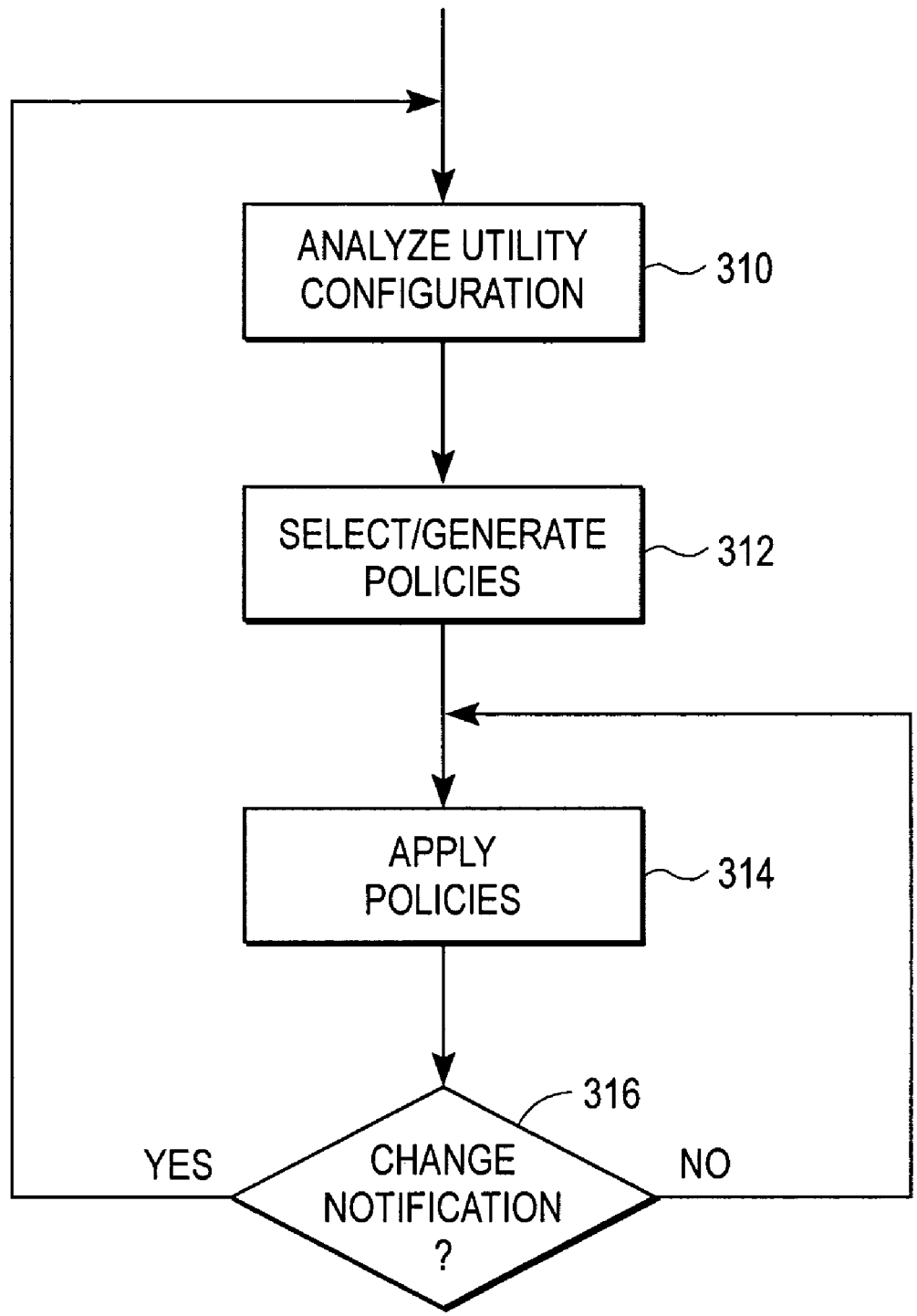
FIG. 3 is a flow chart illustrating steps performed by one embodiment of the utility computing firewall to protect a utility computing system.

FIG. 3 is a flow chart illustrating steps performed by one embodiment of the utility computing firewall 116 to protect a utility computing system 100. Those of skill in the art will recognize that other embodiments can perform different and/or additional steps. Moreover, other embodiments can perform the steps in different orders. Further, some or all of the steps can be performed by an entity other than the firewall 116.

The firewall 116 analyzes 310 the configuration of the utility computing system 100. In one embodiment, the firewall 116 determines the roles provisioned to each node 120 in the pool 110 of resources. This step 310 is performed, for example, by interacting with the notification module 126 in the utility computing manager 112 and/or the agents 122 in the nodes to receive messages describing the state of each node.

The firewall 116 selects and/or generates 312 network traffic policies for the utility computing system 100, including security and/or QoS policies. In general, the security policies provide the minimum set of access rights to the nodes 120 of the pool 110 that are necessary to allow each node 120 to function in its provisioned roles. The QoS policies set the minimum acceptable performance level for the data traffic between the nodes 120 and the network 118. The firewall 116 applies 314 the selected and/or generated network traffic policies to the utility computing system 100. Depending upon the embodiment, the firewall 116 applies the policies on a per-node, per-group, or per-pool basis, and/or on a combination of these bases.

At some point during the operation of the utility computing system 100, the firewall 116 receives 316 an authenticated change notification message. This message indicates that the provisioning of a node 120 has changed. For example, a node 120 can change roles, take on an additional role, become inactive, etc. In response, the firewall 116 analyzes 310 the configuration of the utility computing system in view of the change, selects and/or generates 312 new network traffic policies as may be necessary, and applies 314 the new policies. The analysis performed in response to a change notification message need not be comprehensive. For example, if the message indicates that the provisioning of a single node 120 has changed, the analysis may be performed by determining the new role of the node from the message.

Thus, the utility computing firewall 116 dynamically adapts to changes to provisioning of nodes within the utility computing system 100. The adaptability ensures that the firewall 116 enforces network-level security and QoS in real-time as nodes 120 are provisioned to serve the changing needs of the enterprise. Accordingly, network-dependent applications operate securely in the utility environment.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

We claim:

1. A method of managing network traffic exchanged between a utility computing system having a plurality of nodes provisioned in roles and a network, comprising:
   using a computer to perform steps comprising:
   identifying a group including a plurality of nodes of the utility computing system to which traffic policies are to be applied;
   determining a plurality of roles provisioned to the nodes of the group;
   selecting traffic policies from among a plurality of traffic policies responsive to the plurality of roles provisioned to the nodes of the group;
   merging the selected traffic policies into a merged traffic policy for the nodes of the group; and
   applying the merged traffic policy to network traffic exchanged between the nodes of the group and the network, the merged traffic policy concurrently applying different traffic policies to the nodes and providing a minimum set of network resources necessary for the plurality of nodes to function in the plurality of roles provisioned to the nodes.

2. The method of claim 1, wherein roles provisioned to the nodes are dynamic and wherein the determining step comprises:
   detecting a change to a role provisioned to a node.

3. The method of claim 1, wherein different roles provisioned to the nodes of the group have different network access requirements and wherein the merged traffic policy comprises a security policy that provides a minimum set of network access rights to the nodes in the group that allows the nodes to function in the nodes' provisioned roles.

4. The method of claim 1, wherein the merged traffic policy comprises a Quality-of-Service (QoS) policy describing a minimum acceptable performance level for traffic exchanged between the nodes in the group and the network.

5. The method of claim 4, wherein the selecting comprises:
   generating the QoS policy responsive to requirements of the provisioned roles of the nodes in the group.

6. The method of claim 1, further comprising:
   maintaining a state map describing the provisioning of the nodes of the utility computing system; and
   dynamically updating the state map responsive to changes in the provisioning of the nodes.

7. The method of claim 6, wherein determining the plurality of roles provisioned to the nodes of the group comprises:
   analyzing the state map to determined the provisioned roles for the nodes in the group.

8. The method of claim 1, further comprising:
   receiving a message describing a change to a provisioned role of a node of the utility computing system;
   authenticating the message; and
   reporting the message to an administrator of the utility computing system responsive to the message failing to authenticate.

9. A system for managing network traffic exchanged between a utility computing system having a plurality of nodes provisioned in roles and a network, comprising:
- a processor; and
- a computer-readable storage medium storing processor-executable program instructions comprising:
  - a policy selection module for:
    - identifying a group including a plurality of nodes of the utility computing system to which traffic policies are to be applied;
    - determining a plurality of roles provisioned to the nodes of the group;
    - selecting traffic policies from among a plurality of traffic policies responsive to the plurality of roles provisioned to the nodes of the group;
    - merging the selected traffic policies into a merged traffic policy for the nodes of the group; and
  - a traffic module for applying the merged traffic policy to network traffic exchanged between the nodes of the group and the network, the merged traffic policy concurrently applying different traffic policies to the nodes and providing a minimum set of network resources necessary for the plurality of nodes to function in the plurality of roles provisioned to the nodes.

10. The system of claim 7, wherein different roles provisioned to the nodes of the group have different network access requirements and wherein the merged traffic policy comprises a security policy that provides a minimum set of network access rights to the nodes in the group that allows the nodes to function in the nodes' provisioned roles.

11. The system of claim 7, wherein the merged traffic policy comprises a Quality-of-Service (QoS) policy describing a minimum acceptable performance level for traffic exchanged between the nodes in the group and the network.

12. The system of claim 11, wherein the policy selection module is further adapted to generate the QoS policy responsive to requirements of the provisioned roles of the nodes in the group.

13. A computer-readable storage medium having executable computer program instructions recorded thereon for managing network traffic exchanged between a utility computing system having a plurality of nodes provisioned in roles and a network, comprising:
- a policy selection module for:
  - identifying a group including a plurality of nodes of the utility computing system to which traffic policies are to be applied;
  - determining a plurality of roles provisioned to the nodes of the group;
  - selecting traffic policies from among a plurality of traffic policies responsive to the plurality of roles provisioned to the nodes of the group;
  - merging the selected traffic policies into a merged traffic policy for the nodes of the group; and
- a traffic module for applying the merged traffic policy to network traffic exchanged between the nodes of the group and the network, the merged traffic policy concurrently applying different traffic policies to the nodes and providing a minimum set of network resources necessary for the plurality of nodes to function in the plurality of roles provisioned to the nodes.

14. The computer-readable storage medium of claim 13, wherein different roles provisioned to the nodes of the group have different network access requirements and wherein the merged traffic policy comprises a security policy that provides a minimum set of network access rights to the nodes in the group that allows the nodes to function in the nodes' provisioned roles.

15. The computer-readable storage medium of claim 13, wherein the merged traffic policy comprises a Quality-of-Service (QoS) policy describing a minimum acceptable performance level for traffic exchanged between the nodes in the group and the network.

16. The computer-readable storage medium of claim 15, wherein the policy selection module is further adapted to generate the QoS policy responsive to requirements of the provisioned roles of the nodes in the group.

17. A method of managing network traffic exchanged between a utility computing system having a plurality of nodes provisioned in roles and a network, comprising:
- using a computer to perform steps comprising:
  - determining a plurality of roles provisioned to a node of the utility computing system;
  - identifying a plurality of traffic policies applicable to the plurality of roles of the node;
  - concurrently applying different traffic policies to the node by merging the plurality of traffic policies applicable to the plurality of roles of the node into a merged traffic policy for the node; and
  - applying the merged traffic policy to network traffic exchanged between the node and the network, the merged traffic policy providing a minimum set of network resources necessary for the node to function in its plurality of roles.

* * * * *